US012752456B2

(12) United States Patent
Ogden et al.

(10) Patent No.: US 12,752,456 B2
(45) Date of Patent: Oct. 6, 2026

(54) PARTICLEBOARDS INCLUDING MODIFIED GUAYULE RESINS/SOY PROTEIN RESIN BLENDS AND ASSOCIATED METHODS FOR FORMING SAME

(71) Applicant: Arizona Board of Regents on Behalf of the University of Arizona, Tucson, AZ (US)

(72) Inventors: Kimberly Ogden, Tucson, AZ (US); Sarocha Pradyawong, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 403 days.

(21) Appl. No.: 18/031,730

(22) PCT Filed: Oct. 13, 2021

(86) PCT No.: PCT/US2021/054734
§ 371 (c)(1),
(2) Date: Apr. 13, 2023

(87) PCT Pub. No.: WO2022/081677
PCT Pub. Date: Apr. 21, 2022

(65) Prior Publication Data

US 2023/0382007 A1 Nov. 30, 2023

Related U.S. Application Data

(60) Provisional application No. 63/092,900, filed on Oct. 16, 2020.

(51) Int. Cl.
*B27N 3/00* (2006.01)
*B27N 1/02* (2006.01)
(Continued)

(52) U.S. Cl.
CPC ........... *B27N 3/002* (2013.01); *B27N 1/0209* (2013.01); *B27N 3/02* (2013.01); *B27N 3/203* (2013.01)

(58) Field of Classification Search
None
See application file for complete search history.

(56) References Cited

U.S. PATENT DOCUMENTS 2,410,780 A * 11/1946 Gracia ...................... C08C 3/02
528/488
4,435,337 A 3/1984 Kay et al.
(Continued)

FOREIGN PATENT DOCUMENTS

CN 105838304 B 10/2018
FR 2844998 A1 4/2004

OTHER PUBLICATIONS

Bajwa, Sreekala G. et al., "Properties of Thermoplastic Composites with Cotton and Guayule Biomass Residues as Fiber Fillers", Industrial Crops and Products, vol. 33, 2011, pp. 747-755.
(Continued)

*Primary Examiner* — Chinessa T. Golden
(74) *Attorney, Agent, or Firm* — Howard & Howard Attorneys PLLC

(57) ABSTRACT

A particleboard includes a fiber component and an adhesive composition including a mixture of a modified guayule resin and soy protein. The modified guayule resin can be a base-solvent modified guayule resin or an $H_2O_2$-modified guayule resin. The fiber component can be a natural fiber such as a natural fiber selected from guayule bagasse, wood chips, wood particles, wood waste straw, wood fiber, and any combination thereof. The particleboard is formed by
(Continued)

mixing the adhesive composition with the fiber component, introducing the mixture to a press, and pressing the mixture in the press.

14 Claims, 3 Drawing Sheets

(51) Int. Cl.
*B27N 3/02* (2006.01)
*B27N 3/20* (2006.01)

(56) References Cited

U.S. PATENT DOCUMENTS

| | | | | |
|---|---|---|---|---|
| 5,633,433 | A | 5/1997 | Backhaus et al. | |
| 6,231,970 | B1 | 5/2001 | Andersen et al. | |
| 6,518,387 | B2 | 2/2003 | Kuo et al. | |
| 6,787,590 | B2 | 9/2004 | Nakayama et al. | |
| 7,416,598 | B2 | 8/2008 | Sun et al. | |
| 7,790,036 | B2 | 9/2010 | Cornish et al. | |
| 9,969,818 | B2 | 5/2018 | Battistel et al. | |
| 2012/0063969 | A1 | 3/2012 | Cornish et al. | |
| 2014/0288255 | A1* | 9/2014 | Martin | C08C 2/02 526/340.4 |
| 2014/0329102 | A1* | 11/2014 | Randall | C09J 11/06 524/575.5 |
| 2017/0081484 | A1 | 3/2017 | Jagannathan et al. | |
| 2018/0282595 | A1 | 10/2018 | Cruz et al. | |
| 2019/0127495 | A1* | 5/2019 | Sauty | B60C 1/00 |
| 2020/0308375 | A1 | 10/2020 | Tardiff et al. | |

OTHER PUBLICATIONS

Boateng, Akwasi et al., "Energy-Dense Liquid Fuel Intermediates by Pyrolysis of Guayule (Parthenium argentatum) Shrub and Bagasse", Fuel, vol. 88, 2009, pp. 2207-2215.

Bultman, John D. et al., "The Efficacy of Guayule Resin as a Pesticide", Bioresource Technology, vol. 35, 1991, pp. 197-201.

Cantu, D. Jasso et al., "Seasonal Growth, Rubber and Resin Yield Characteristics of Guayule Under Natural Environmental Conditions", Industrial Crops and Products, vol. 6, 1997, pp. 131-137.

Estilai, Ali, "Biomass, Rubber, and Resin Yield Potentials of New Guayule Germplasm", Bioresource Technology, vol. 35, 1991, pp. 119-125.

Foster, M.A. et al., "Guayule Agronomics: Establishment, Irrigated Production, and Weed Control", Industrial Crops and Products, vol. 22, 2005, pp. 27-40.

Holt, G.A. et al., "Termite Resistance of Biobased Composition Boards Made from Byproducts and Guayule Bagasse", Industrial Crops and Products, vol. 36, 2012, pp. 508-512.

International Search Report for Application No. PCT/US2021/054734 dated Mar. 1, 2022, 1 page.

Kuester, James L., "Conversion of Guayule Residues into Fuel Energy Products", Bioresource Technology, vol. 35, 1991, pp. 217-222.

Mo, Xiaoqun et al., "Themal Properties and Adhesion Strength of Modified Soybean Storage Proteins", JAOCS, vol. 18, No. 4, 2004, pp. 395-400.

Nakayama, F.S., "Guayule Future Development", Industrial Crops and Products, vol. 22, 2005, pp. 3-13.

Pradyawong, Sarocha et al., "Adhesion Properties of Soy Protein Adhesives Enhanced by Biomass Lignin", International Journal of Adhesion and Adhesives, vol. 75, 2017, pp. 66-73.

Rasutis, Daina et al., "A Sustainability Review of Domestic Rubber from the Guayule Plant", Industrial Crops and Products, vol. 70, 2015, pp. 383-394.

Ray, Dennis T. et al., "Breeding Guayule for Commercial Production", Industrial Crops and Products, vol. 22, 2005, pp. 15-25.

Schloman, Jr., W.W. et al., "Handbook of Elastomers—Chapter 1: Guayule Rubber", Marcel Dekker, Inc., 2nd Edition, 2000-2001, 29 pages.

Schloman, Jr., W.W., "Processing Guayule for Latex and Bulk Rubber", Industrial Crops and Products, vol. 22, 2005, pp. 41-47.

Schloman, Jr., William W. et al., "Guayule Byproduct Evaluation: Extract Characterization", American Chemical Society, 1983, pp. 873-876.

Wagner, J.P. et al., "Establishing a Domestic Guayule Natural Rubber Industry", Polymer-Plastics Technology and Engineering, vol. 28, Nos. 7-8, 1989, pp. 753-777.

English language abstract and machine-assisted English translation for CN 105838304 B extracted from espacenet.com database on May 13, 2025, 12 pages.

English language abstract and machine-assisted English translation for FR 2844998 A1 extracted from espacenet.com database on Oct. 1, 2025, 23 pages.

* cited by examiner (a) - Sample (1) from Table 1
(b) - Sample (2) from Table 1
(c) - Sample (3) from Table 1
(d) - Sample (4) from Table 1

PARTICLEBOARDS INCLUDING MODIFIED GUAYULE RESINS/SOY PROTEIN RESIN BLENDS AND ASSOCIATED METHODS FOR FORMING SAME

RELATED APPLICATIONS

This application claims priority to and the benefit of U.S. Provisional Patent Application No. 63/092,900, filed on Oct. 16, 2020, the entire contents of which are hereby incorporated by reference.

GOVERNMENT SUPPORT

This invention was made with government support under Grant No. 2017-68005-26867, awarded by USDA/NIFA. The government has certain rights in the invention.

FIELD OF THE INVENTION

The present invention relates generally to particleboards, and more particular particleboards including modified guayule resin/soy protein resin blends and a fiber component and associated methods for forming same.

DESCRIPTION OF THE RELATED ART

Guayule has the potential to replace both synthetic and natural rubber in a wide variety of potential applications and products. The use of guayule could help the United States decrease its reliance on non-renewable petroleum sources and imported natural rubber (Rasutis et al., 2015). Guayule has drawn a commercial interest due to the success of guayule rubber yield enhancement from breed improvement and growing techniques (Foster et al., 2005; Ray et al., 2005). Additionally, guayule is a low input crop with a stable price regarding a consistent domestic supply (Rasutis et al., 2015; Rodríguez-García et al., 1998).

Guayule rubber is extracted by the simultaneous extraction method which includes solvent extraction and solvent removal processes (Schloman Jr and Products, 2005; Schloman Jr and McIntyre, 2000). The major by-products of this rubber extraction process are guayule bagasse and resin. Utilization of these by-products will help the overall economic sustainability of guayule (Estilai, 1991; Rasutis et al., 2015; Wagner et al., 1989). Guayule resin can be applied to a wide range of applications, such as pesticides, fuel, cosmetics, pharmaceuticals, paint, wood preservation as well as adhesives (Boateng et al., 2009; Bultman et al., 1991; Kuester, 1991; Nakayama and Products, 2005).

Soy Protein (SP) can also be utilized in a bio-based adhesives and has shown a high potential to replace formaldehyde-based adhesives in wood-based industries. Improvement of water resistance would help to explore the market share of SP-based adhesives (Grand View Research, 2017; Mo et al., 2004; Pradyawong et al., 2017).

The cost of making wood composite has increased due to the increase in the price of wood supply; hence, guayule bagasse could be one of the alternative less expensive options. Guayule bagasse had proved to be a good alternative source for composite board with anti-termite resistance property (Bajwa et al., 2011; Holt et al., 2012). However, the composite board still relies on petroleum-based chemicals to form the adhesive composition used to make these particleboards. Accordingly, developing a wood composite with all natural and renewable materials that combine guayule resins with soy proteins, and which utilize guayule bagasse, wood chip, wood particles, wood waste straw, and/or wood fiber as the fiber component could provide one solution for addressing the global demand of environmentally friendly and sustainable products such as wood composites or particleboards.

SUMMARY OF THE INVENTION AND ADVANTAGES

A particleboard includes a fiber component and an adhesive composition including a mixture of a modified guayule resin and soy protein.

The fiber component can be a natural fiber such as plant fibers, wood fibers, cellulosic fibers, and the like. In certain embodiments, the fiber component is selected from guayule bagasse, wood chips, wood particles, wood waste straw, wood fiber, and any combination thereof. The modified guayule resin can be a base-solvent modified guayule resin or an $H_2O_2$-modified guayule resin (i.e., a hydrogen peroxide modified guayule resin). The particleboard is formed by mixing the adhesive composition with the fiber component, introducing the mixture to a press, and pressing the mixture in the press.

In certain embodiments, the modified guayule resin is included in the adhesive composition in an amount ranging from 0.1% to 25% of the total weight of the adhesive composition, while the soy protein is included in the adhesive composition in an amount ranging 5% to 40% by weight of the total weight of the adhesive composition. Still further, the weight ratio of the fiber component to the adhesive composition in the composite or particleboard can vary from 99.9:0.1 to 0.1:99.1.

The resultant composite, or particleboard, formed in accordance with the exemplary embodiments has mechanical properties comparable to particle boards formed from soy protein adhesives alone while also having enhanced wet shear strength, and hence improved water repellent features, as compared with particleboards formed from soy protein adhesives alone. Further, the composites and particleboards formed in accordance with the present invention are environmentally friendly and sustainable products.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 1:
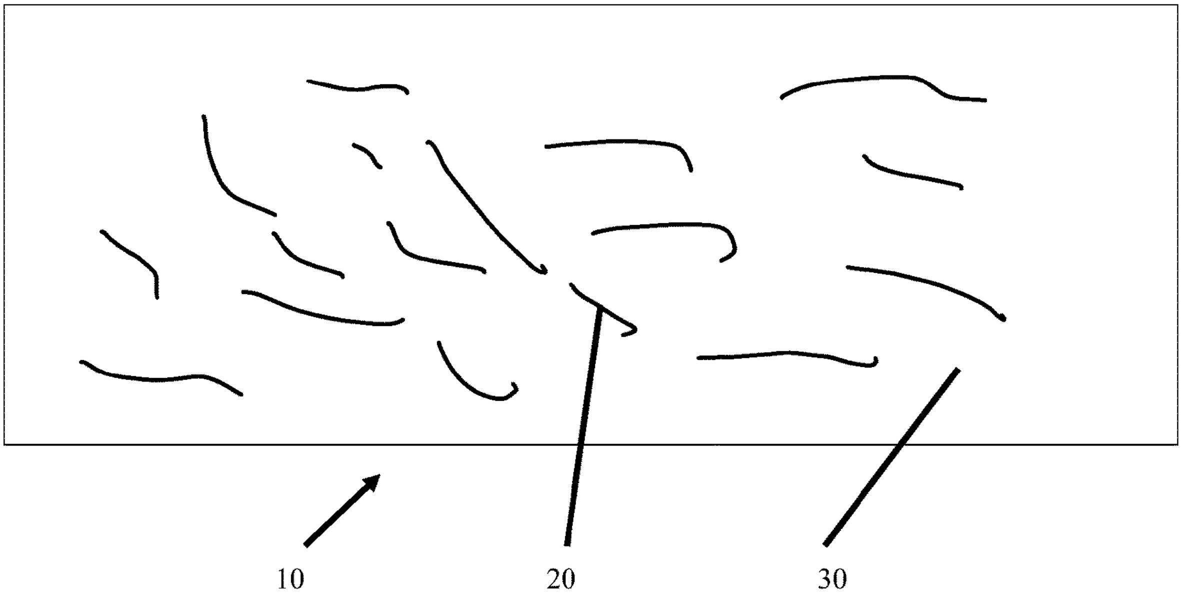
FIG. 1 is a side schematic view of a particleboard formed in accordance with the exemplary embodiments.

The present invention relates to composites, such as particleboards, formed from bio-based adhesive compositions derived from guayule and fiber components such as fiber components also derived from guayule.

The adhesive composition of the exemplary embodiments includes a mixture of a modified guayule resin and soy protein and optionally includes an unmodified guayule base resin. The modified guayule resin can be in the form of a base-solvent modified guayule resin, formed via a base-solvent process, or in the form of an $H_2O_2$-modified guayule resin, formed via a $H_2O_2$ modification process, each process further described below.

In certain embodiments, the soy protein is included in the adhesive composition in an amount ranging from 5% to 40% by weight of the total weight of the adhesive composition, such as from 8% to 12% by weight of the total weight of the adhesive composition, such as 10% by weight of the total weight of the adhesive composition.

The modified guayule resin in accordance with the exemplary embodiments is formed from a guayule base resin, also alternatively referred to herein as an unmodified guayule resin or the unmodified guayule In certain embodiments, the modified guayule resin is included in the adhesive composition in an amount ranging from 0.1% to 25% by weight of the total weight of the adhesive composition, such as from 0.5% to 10% by weight of the total weight of the adhesive composition, such as 0.75% by weight of the total weight of the adhesive composition. Still further, in certain embodiments, the modified guayule resin is included in the adhesive composition in an amount ranging 0.1% to 50% by weight of the total weight of the soy protein, such as from 0.1% to 30%, such as 7.5% by weight of the total weight of the soy protein.

In still further embodiments, the soy protein is included in the adhesive composition in an amount ranging 5% to 40% by weight of the total weight of the adhesive composition such as from 8% to 12% by weight of the total weight of the adhesive composition, such as 10% by weight of the total weight of the adhesive composition, and the modified guayule resin is included in the adhesive composition ranging from 0.1% to 25% of the total weight of the adhesive composition, such as from 0.5% to 10% of the total weight of the adhesive composition, such as 0.75% of the total weight of the adhesive composition. Still further, in these still further embodiments, the modified guayule resin is included in the adhesive composition in an amount ranging 0.1% to 50% by weight of the total weight of the soy protein, such as from 0.1% to 30%, such as 7.5% by weight of the total weight of the soy protein.

In yet still further embodiments, wherein the unmodified guayule resin is included in the adhesive composition in addition to the modified guayule resin, the total amount of the modified guayule resin and unmodified guayule included in the adhesive composition ranges from 0.1% to 25% of the total weight of the adhesive composition, such as from 5 to 10% of the total weight of the adhesive composition, such as 0.75% of the total weight of the adhesive composition. In these embodiments, the weight ratio of modified guayule resin to unmodified guayule is not limited and may be between 100:0 to 0:100, such as from 99.9:0.1 to 0.1:99.9. Preferably, however, the total weight of the modified guayule resin is greater than or equal to the total weight of the unmodified guayule resin in the adhesive composition, and even more preferably is significantly greater than the total weight of the unmodified guayule resin, such as by two time or more greater than the total weight of the unmodified guayule resin. Accordingly, in certain embodiments, the weight ratio of modified guayule resin to unmodified guayule resin is from 100:0 to 50:50, such as from 99.9:0.1 to 50.1:49.9, such as from 99.9:0.1 to 66.6:33.3, such as from 99.9:0.1 to 75:25. Even still further, in these yet still further embodiments, the modified guayule resin is included in the adhesive composition in an amount ranging 0.1% to 50% by weight of the total weight of the soy protein, such as from 0.1% to 30%, such as 7.5% by weight of the total weight of the soy protein.

The guayule base resin may be provided from any commercial source or may be obtained as one of the major by-products when guayule rubber is extracted from a guayule plant by the simultaneous extraction method which includes solvent extraction and a solvent removal processes.

In certain embodiments, the guayule base resin is obtained as a by-product from a guayule rubber extraction process operating at various solvent removal temperatures in the range of 104 to 166 degrees Celsius (° C.) by the known processes such as the processes described above (see Schloman Jr and Products, 2005; Schloman Jr and McIntyre, 2000). In certain embodiments, such as in the examples provided below, the guayule base resin is obtained as a by-product from guayule rubber extraction via such known solvent extraction processes operating at solvent removal temperatures of 104.44° C., 115.56° C., 126.67° C., 137.78° C., and 165.56° C., respectively.

The soy protein, in certain embodiments, may be commercially provided, such as in the form of a powder, or may be obtained from defatted soy flour as a powder. In certain embodiments, a defatted soy flour is dissolved in water to form a soy protein solution, with the pH of the soy protein solution being adjusted to between 8.0 and 9.0, such as 8.5, using a base such as NaOH and to solubilize the soy protein (SP) in the soy protein solution. The solution is then centrifuged, with the supernatant solution containing the soy protein and water separated from the precipitants such as fiber. The supernatant solution is then adjusted to a pH of between 4.2 and 4.5, such as about 4.2, with an acid such as hydrochloric acid for a period of about two hours to precipitate the soy protein from the supernatant. The supernatant is then removed and discarded, and the precipitated soy protein is resolubilized with water and then neutralized to a neutral pH, such as to a pH of 7.0. The resultant soy protein solution, in the form of a slurry, is freeze-dried and ground to form a soy protein powder.

The precipitated soy protein is then removed from the solution and freeze-dried and ground to form a soy protein powder. Alternatively, the soy protein may be utilized in the form of a soy protein slurry, with the slurry being formed by slowly adding soy protein to water to form a phase-modified soy protein which is adjusted to a neutral pH between 6.0 and 8.0, typically a pH of 7.0.

As provided herein, and including in the Examples below, the description of a pH of any number approximates that number within a range of +/−0.5 of the number provided. Accordingly, the description of the pH of 7.0 above includes pH's ranging from 6.5 to 7.5 as described herein, whereas the description of the pH of 8.5 includes pH's ranging from 8.0 to 9.0 and the description of the pH of 4.2 includes pH's ranging from 3.7 to 4.7. As noted above, the modified guayule resin may be in the form of a base-solvent modified guayule resin. To form the base-solvent modified guayule resin via the base-solvent process in accordance with one exemplary embodiment, the guayule base resin as described above is mixed with a solvent mixture to form a resin mixture. In certain embodiments, the solvent mixture includes hexane, acetone, and water mixed at a ratio of 5:5:3 by volume. A base, such as NaOH, is then added to the resin mixture and mixed. During this mixing, the base and guayule base resin react, such as via a saponification process, to form the base-solvent modified-guayule resin, here a base-solvent modified guayule resin, contained within the solvent mixture.

As noted above, the modified guayule resin may be in the form of a $H_2O_2$-modified guayule resin. To form the $H_2O_2$-modified guayule resin via the $H_2O_2$ modification process in accordance with another exemplary embodiment, the guayule base resin as described above is first dissolved in a solvent such as acetone to form a solution mixture. A 50% by volume mixture of $H_2O_2$ in water is then added to the solution mixture and mixed for a predetermined time period sufficient to react with $H_2O_2$ with the guayule base resin, such as through oxidation, to form the $H_2O_2$-modified guayule resin.

As provided herein, and including in the Examples below, the description of any mixtures by volume approximates the numbers of the mixture components provided in the range of +/−10%. Accordingly, a solvent mixture includes hexane, acetone, and water mixed at a ratio of 5:5:3 by volume may have slightly varying amounts of the respective volumes of hexane, acetone, and water within 10 volume % of the values provided, while a 50% by volume mixture of $H_2O_2$ in water may have up to 10% more or less volume $H_2O_2$ relative to the volume of water. Similarly, and including in the Examples below, the description of any mixtures by weight approximates the numbers of the mixture components provided in the range of +/−10%.

Finally, to form the adhesive composition, the modified guayule resin (i.e., either the base-solvent modified guayule resin or the $H_2O_2$-modified guayule resin, or both, as described above) alone or in combination with the unmodified guayule resin, is mixed with the soy protein. A solvent, preferably water, may then added to the resultant mixture to form that adhesive having the relative weight ratios of soy protein and modified guayule resin as described above. In alternative embodiments, the adhesive may be formed from the modified guayule resin alone, or in combination with the unmodified guayule resin and without soy protein.

In certain embodiments, the adhesive composition is formed by mixing the modified guayule resin with a soy protein slurry. A solvent, preferably water, may then added to the resultant mixture to form that adhesive having the relative weight ratios of soy protein and modified guayule resin as described above.

In certain embodiments of the present invention, the resultant adhesive compositions as described above may then be combined with a fiber component to form various a composite material such as a particleboard.

The fiber component can include any types of fibers known to those of ordinary skill in the field of forming composite materials. In particular, the fibers that can be utilized in forming the composites according to the exemplary embodiments include high strength and/or high modulus fibers such as natural fibers.

Exemplary natural fibers are fibers made or directly derived from living organisms and include plant fibers such as seed fibers, leaf fibers, base fibers, fruit fibers and stalk fibers. Further exemplary natural fibers also include wood fibers, cellulosic fibers, and the like. Exemplary natural fibers derived from wood, in addition to wood fibers, may also include wood chips, wood particles, and wood waste straw.

In certain embodiments, the fiber component for use in forming the composites includes guayule bagasse (i.e., guayule bagasse fiber) alone or in combination with any one or more of the afore-mentioned other fibers. Guayule bagasse is typically obtained as another major by-product (in addition to the unmodified guayule resin) is from a guayule rubber extraction process described above (see Schloman Jr and Products, 2005; Schloman Jr and McIntyre, 2000). For the purposes of description herein, guayule bagasse refers to the pulpy residue left over after the extraction of liquids or other products (such as guayule resin) from guayule, and guayule bagasse may be obtained from any process and is not limited to the guayule rubber extraction process as described above. The guayule bagasse may be obtained in various fiber lengths.

The present invention also contemplates the use of other types of fiber in the fiber component used to form the composites, and in particular the particleboards of the exemplary embodiments. Such fibers include, in addition to or as an alternative to the guayule bagasse or natural fibers as described above, mineral fibers, or synthetic fibers formed by chemical processes well known to those of ordinary skill.

Referring to FIG. 1, a particleboard 10 in accordance with an exemplary embodiment is provided and includes the fiber component 20 and the adhesive composition 30 in accordance with the exemplary embodiments as described above mixed into a resin/fiber matrix, with the resultant composite or particleboard 10 having a desired width, length, and thickness. FIG. 1 is schematic in nature and is merely illustrating the major components and is not intended to illustrate the actual fiber and resin ratios as described below. Unless otherwise indicated, the fiber component 20 can include types of fibers as described above, while the adhesive composition 30 includes the modified guayule resin as described above.

Figure 2:
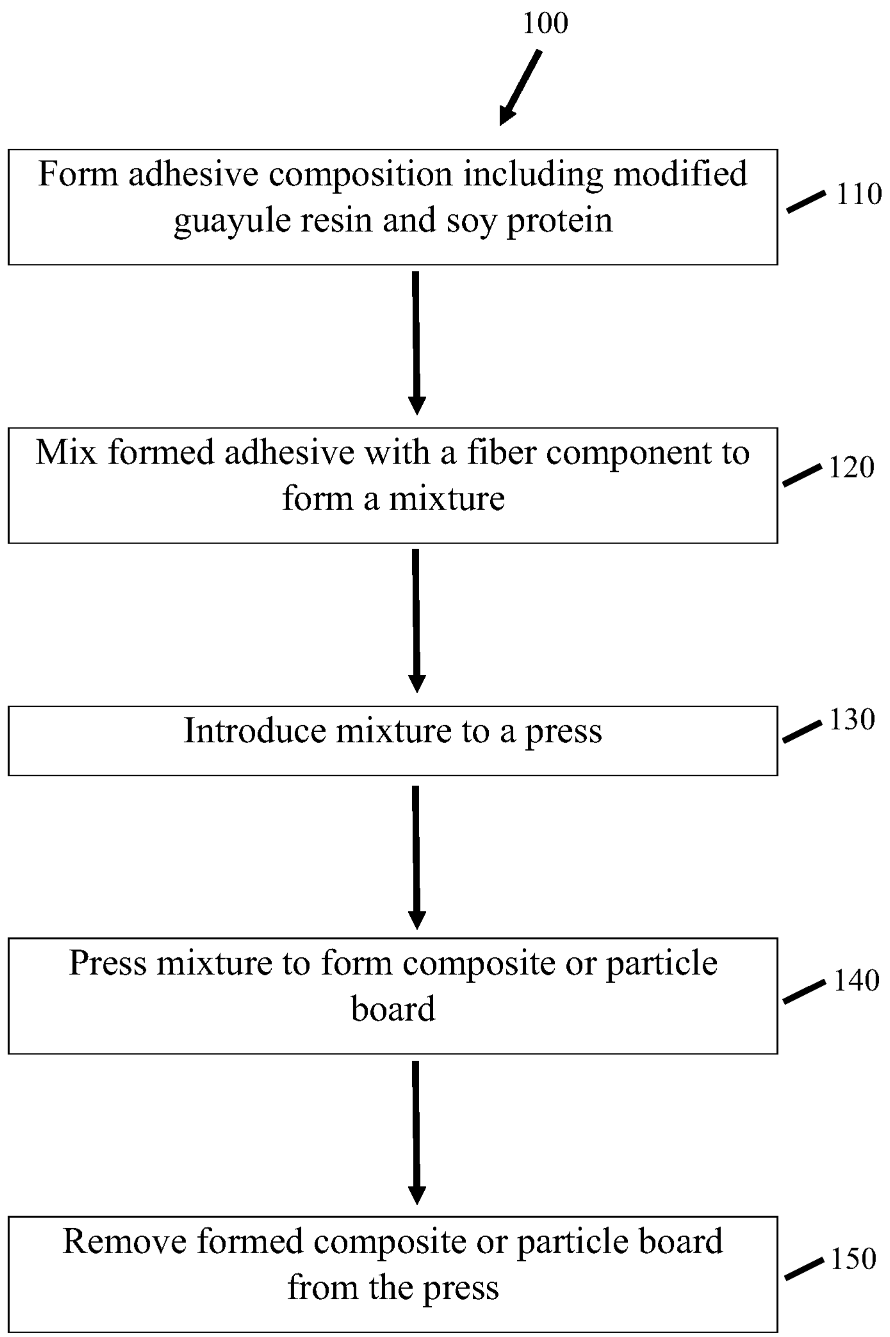
FIG. 2 is a logic flow diagram for forming the particleboard in accordance with the exemplary embodiments, and FIG. 3 are pictures of particleboard samples (1), (2), (3) and (4) as described in Table 1 of Example 1.

To form the particleboard 10 in FIG. 1, as illustrated in the logic flow diagram 100 of FIG. 2, beginning at step 110, the process begins by forming an adhesive composition including a modified guayule resin and soy protein.

In certain embodiments, the process of forming the adhesive composition of step 110 includes the steps of forming a modified guayule resin; forming a soy protein slurry comprising a soy protein; and mixing the modified guayule resin with the soy protein slurry.

As a part of step 110, the step of forming a modified guayule resin may include the steps of forming a solution by dissolving a guayule base resin in a solvent; adding $H_2O_2$ to the solution; and reacting the $H_2O_2$ with the guayule base resin.

Still further, as a part of step 110, the step of forming a soy protein slurry may include the steps of forming a phase-modified soy protein by mixing a soy protein with water and introducing an acid to the phase-modified protein to adjust the pH to 7.0.

Next, in step 120, the formed adhesive composition 30 in accordance with any of the embodiments described above is mixed with the fiber component 20, such as guayule bagasse 20 as illustrated in FIG. 1, to form a mixture in which the fiber component 20 is generally uniformly dispersed within the adhesive composition 30.

The relative weight ratio of the adhesive composition 30 to the fiber component 20 in the mixture can vary, depending upon the adhesive composition 30 and the fiber component and also based upon the desired properties of the formed composite or particleboard 10. In certain embodiments, the weight ratio of the fiber component 20 to adhesive composition 30 in the mixture can vary from 99.9:0.1 to 0.1:99, such as from 90:10 to 10:90, such as from 80:20 to 20:80 such as from 70:30 to 30:70, such as from 60:40 to 40:60, such as 50:50.

Next, in step 130, the mixture is then introduced to a press (not shown). In step 140, the mixture is then pressed within the press at forces sufficient to form a composite 10, such as a particleboard 10, having a desired density. In certain embodiments, the pressing force ranges from 0.75 to 25 megaPascals (108 to 3675 pounds per square inch), such as from 13.8 to 20.7 megaPascals (about 2000 to 3000 pounds per square inch) and at temperatures ranging from 100 to 190 degrees Celsius, such as from 125 to 175 degrees Celsius for a sufficient time period to bind the adhesive composition 30 to the fiber component 20.

During this pressing step, the adhesive composition 30 may cure or otherwise harden to fix the fiber component 20 within the adhesive composition 30 in the desired resin/fiber matrix to form the composite or particleboard 10. In certain embodiments, the pressing force varies between 0.75 to 25 megaPascals, as noted above, depending upon the desired density of the resultant particleboard 10, with lower pressing forces forming a lower density particleboard 10 and higher pressing forces forming a higher density particleboard 10. In further embodiments, the pressing force varies between 0.75 to 25 megaPascals based upon the desired dimensions of the formed composite or particleboard 10, alone or in combination with the desired density. The pressing step may be repeated as necessary.

Finally, in step 150, the formed composite or particleboard 10 is removed from the press.

While FIG. 2 illustrates one exemplary process for forming a composite or particleboard 10, other exemplary processes similar to the pressing process within the scope of the present invention may alternatively be utilized. By one of one alternative non-limiting example, the composite or particleboard 10 may be formed in a mold in which the pre-mixed adhesive composition 30 and fiber component are introduced and heated under pressure for time sufficient to cure the adhesive composition.

The resultant composite, or particleboard 10, formed in the process of FIG. 2 (or alternative forming process) that include the modified guayule resins in combination with soy protein in the adhesive composition 10 in accordance with the exemplary embodiments and methods as described above can form composites or particleboard 10 having desired mechanical properties which are similar to composites and particleboards formed from soy protein adhesives alone. The introduction of the combination of the modified guayule resin and soy protein in the adhesive composition 30 is believed to provide enhanced wet shear strength, and hence improved water repellent features, to the formed composite or particleboard 10 as compared to particleboards formed from soy protein adhesives alone. Moreover, the use of the modified guayule resins as the adhesive composition 10 and guayule bagasse, wood chips, wood particles, wood waste, straw and/or fiber as the fiber component 20 in composites or particleboards 10 in accordance with the exemplary embodiments provides an environmentally friendly alternative and cost effective solution to particleboards formed from non-bio-based adhesives and wood fibers. Yet still further, the use of the modified guayule resins as the adhesive composition 10 and guayule bagasse, wood chips, wood particles, wood waste, straw and/or fiber as the fiber component 20 in composites or particleboards 10 in accordance with the exemplary embodiments is thought to provide enhanced anti-termite and/or enhanced anti-insecticide properties as compared with particleboards formed from non-bio-based adhesives and wood fibers.

EXAMPLES

Particleboards were prepared by in accordance with the exemplary embodiments of the present invention and compared to particleboards formed from soy protein adhesives, or guayule adhesives containing modified guayules resins in accordance with the exemplary embodiments (with or without unmodified guayule resins) as described above. The particleboard compositions and pressing conditions were listed on Table 1, and the resultant formed particleboards are pictured in FIG. 3 and characterized in Table 1 below.

Step 1—Guayule Base Resin and Guayule Bagasse Information

Guayule base resins (unmodified) were obtained from Bridgestone Americas of Akron, Ohio. These resins were previously prepared in a rubber extraction process of guayule with solvents removed after a solvent removal process operating at the temperature of 104.44° C., 115.56° C., 126.67° C., 137.78° C., and 165.56° C., respectively, and may alternatively be referred to as R104, R116, R127, R138, and R166 for simplicity.

Guayule bagasse was also obtained from Bridgestone Americas of Akron, Ohio as another by-product of the rubber extraction process as described above.

Step 2—Soy Protein Isolation

Defatted soy flour with a dispersion index of 90 (obtained from Cargill of Cedar Rapids, IA) was dissolved in water at a ratio of 1:15 (w/w). The pH of the soy protein solution was adjusted to 8.5 with 10 M NaOH to solubilize the soy protein (SP) in the soy protein solution. The pH was kept at 8.5 constantly for 2 hours. The solution was then centrifuged, with the supernatant solution containing the soy protein and water separated from the precipitants such as fiber. The pH of the separated supernatant solution was then adjusted to pH 4.2 with 10 M HCl for two hours to precipitate the soy protein, at which time an additional centrifugation step was performed. The supernatant was then separated from the precipitated soy protein and discarded, with the remaining precipitated soy protein washed and then resolubilized in water to form an SP solution. The SP solution was then neutralized to pH 7.0 with 10 M NaOH. The soy protein was then freeze-dried and ground with a cyclone miller (Udy Corp., Fort Collins, CO.) equipped with a 1 millimeter screen. The freeze-dried and ground soy protein powder was stored at 4° C.

Step 3—Preparation of SP Slurry 2 grams of the soy protein powder obtained from Step 2 above was slowly added to 17 grams of water to form a phase-modified soy protein, which was stirred at 300 rpm for 15 minutes to form a soy protein slurry. The pH of the resultant soy protein slurry was adjusted to 7.0 with 2 M HCl and then stirred at 300 rpm for an additional 2 hours.

Step 4—Base-Solvent Modified Guayule Resin in Solvent Preparation

A solvent mixture was prepared by combining 5 milliliters of hexane, 5 milliliters of acetone, and 3 milliliters of water. One gram of guayule base resin from Step 1 above was added to the solvent mixture and stirred at 400 rpm for 30 minutes to form a resin mixture. Next, 5 milliliter of 10 M NaOH was added to the resin mixture and the combination was stirred at 400 rpm for another 18 hours. During this time period, the NaOH and guayule base resin reacted, via a saponification process, to form a modified-guayule resin (i.e., a base-solvent modified guayule resin) contained within the solvent mixture. The process described was repeated for each of the guayule base resins from above (i.e., for each of R104, R116, R127, R138 and R166, respectively), with the resultant base-solvent modified resins formed respectively from the guayule base resins referred to as BR104, BR116, BR127, BR138, and BR166 for simplicity In particular, each of the BR104, BR116, BR127, BR138, and BR166 adhesive compositions formed in Step 4 include 10% by weight of the respective base-solvent modified guayule base resins and 90% by weight of solvent.

Step 5—Standard SP Adhesive Preparation 19 grams of the SP slurry formed in Step 3 above was mixed with an additional gram of water to form a standard SP adhesive having 10% by weight soy protein.

Step 6—Base-Solvent Modified Guayule Resin-SP Adhesive Preparation 0.15 grams of the bottom phase of the formed modified guayule resin in acetone was extracted from the resin prepared in Step 4. This 1 milliliter mixture, weighing approximately 1 gram, was then pipetted into a container containing 19 grams of the soy protein slurry formed in Step 3 above and mixed to form a base-solvent modified guayule resin-SP adhesive sample having a modified guayule resin concentration of 0.75% (w/w)(i.e., the weight percentage of modified guayule resin in the total weight of the adhesive—0.15 g/20 g times 100% is 0.75%) and having a soy protein content of 10% by weight of the total weight of the adhesive composition.

Each of the resultant base-solvent modified guayule resin-SP adhesive samples formed from the procedure of Step 6 were labeled SP-BR104, SP-BR116, SP-BR127, SP-BR138, and SP-BR166, respectively. The letter designation SP refers to soy protein and BR refer to base-solvent resin modified, while the number designation such as 104 refers to the original solvent removal temperatures of the guayule base resins provided by Bridgestone Americas from Step 1 above.

Step 7—$H_2O_2$ Modified Guayule Resin Mixture Preparation and subsequent $H_2O_2$ Modified Guayule Resin/SP Adhesive Preparation Approximately 5 grams of the guayule base resin as provided in Step 1 of Example 1 above was dissolved in 50 milliliters of acetone to form a solution mixture. 3 milliliters of 50% $H_2O_2$ by volume in water was added to the solution mixture and stirred overnight at 400 rpm to form an $H_2O_2$-modified guayule resin mixture that includes an $H_2O_2$-modified guayule resin in solvent. The same process was repeated for each of the different guayule base resins to form additional $H_2O_2$-modified guayule resin mixtures. The $H_2O_2$-modified guayule resin mixtures may be labeled HR-104, HR-116, HR-127, HR-138, and HR-166 for simplicity. The letter designation HR refers to $H_2O_2$-modified guayule resin while the number designation such as 104 refers to the original solvent removal temperatures of the guayule base resins provided by Bridgestone Americas from Step 1 above.

Approximately 2 milliliters of the $H_2O_2$-modified guayule resin mixture was then blended with the soy protein slurry provided in Step 3 of Example 1 above having 2 grams of soy protein powder. Water was added to adjust the total soy protein concentration in the resultant $H_2O_2$-modified guayule resin-SP adhesive to 10% by weight soy protein.

The same process was repeated for each of the different guayule base resins mixtures (i.e., for each of R104, R166)) to form additional $H_2O_2$-modified guayule resin-SP adhesives by the same process described above, with the resultant $H_2O_2$-modified guayule resin-SP adhesives labeled SP-HR104 and SP-HR166, respectively, and having total soy protein concentration in the resultant $H_2O_2$-modified guayule resin-SP adhesive of 10% by weight soy protein based on the total weight of the respective adhesive composition. The letter designation SP refers to soy protein and HR refers, again, to $H_2O_2$-modified guayule resin, while the number designation such as 104 in SP-HR104 refers to the original solvent removal temperatures of the guayule base resins provided by Bridgestone Americas.

Step 8—Particleboard Sample Preparation and Testing

Sample particleboards were prepared according to the following procedure.

First, the various adhesive compositions were prepared for use in particleboard samples (1), (2), (3) and (4) which are summarized under the heading "Adhesive Formula" in Table 1 below.

In particular, sample (1) corresponds to the standard SP adhesive which was prepared in accordance with the procedure of Step 5 above. Sample (2) was prepared by mixing the 63.5 grams of SP-BR166 adhesive composition (formed in accordance with Step 6 above) with 1.5 grams of soy protein powder and 15 grams of deionized water. Sample (3) was prepared by mixing 13.3 milliliters each (for a total of 50 milliliters) of R166 (from Step 1 above, mixed with toluene), HR-104 (formed in accordance with Step 7 above, and HR-166 (also formed in accordance with Step 7 above) with additional amounts of acetone to form 95 grams of an adhesive composition. Sample (4) corresponds to BR-166 formed in accordance with Step 4 above.

Once the adhesive compositions corresponding to samples (1)-(4) were formed, they were each respectively mixed with bagasse fiber at a 50:50 by weight ratio to form a generally uniform mixture of fiber and adhesive. The mixtures were then introduced to a press under the conditions listed in Table 1 (pressing time, force, and temperature) to form the resultant particleboards illustrated in FIG. 3.

TABLE 1

PARTICLEBOARD COMPOSITIONS

| Sample Number | Bagasse (g) | Adhesive (g) | Adhesive formula |
|---|---|---|---|
| (1) | 80 | 80 | Standard SP adhesive described in Step 5 above |
| (2) | 80 | 80 | 63.5 grams of SP-BR166 was mixed with 1.5 grams of soy protein powder and 15 grams of deionized water |
| (3) | 95 | 95 | HR104 (50 ml) + R166 in toluene + HR166 + acetone to get the total wt. = 95 grams |
| (4) | 95 | 95 | BR166 |

| Samples | Pressing Time (minutes) | Force (psi) | Temp (° C.) | Observations |
|---|---|---|---|---|
| (1) | 15 + 10 minutes repress | 2000 | 150 | Smooth, waxy surface |
| (2) | 20 + 5 minutes repress | 3000 | 150 | Darker color, waxy surface |

TABLE 1-continued

| PARTICLEBOARD COMPOSITIONS | | | | |
|---|---|---|---|---|
| (3) | 20 + 5 minutes repress | 3000 | 150 | Weak, non-waxy surface |
| (4) | 20 + 5 minutes repress | 3000 | 150 | Unsmooth surface |

Figure 3:
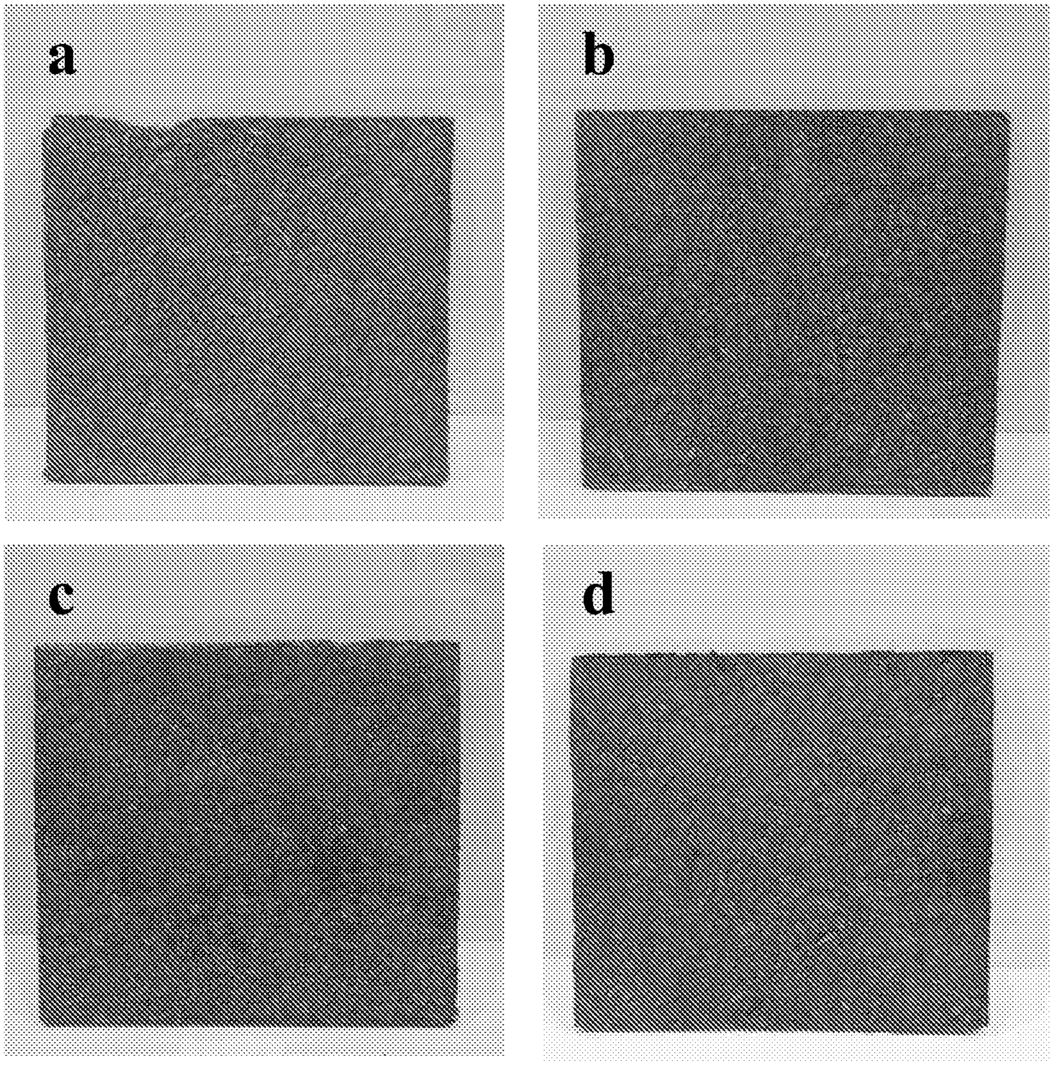

According to the morphological observations as summarized in Table 1 and illustrated in FIG. 3, the samples with soy protein mixture (sample (1) showed a stronger texture with waxy surface. The samples (2)-(4) that included the modified guayule resin, especially sample (3), were darker in color than sample (1). Sample (4) was observed to be stronger and showed a more compacted surface than sample (3) which included a significant amount of the unmodified resin. No change was observed in each of the samples (1)-(4) after storage for 15 months at room temperature.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A particleboard comprising:

a fiber component; and an adhesive composition comprising a mixture of a base-solvent modified guayule resin and soy protein, wherein said base-solvent modified guayule resin is formed by:

forming a resin mixture by mixing an unmodified guayule base resin with a solvent mixture, the solvent mixture comprising acetone, mixing a base with the resin mixture, reacting the base with the unmodified guayule base resin via a saponification process within the resin mixture, and extracting a bottom phase of the base-solvent modified guayule resin in acetone.

2. The particleboard according to claim 1, wherein said fiber component comprises natural fibers.

3. The particleboard according to claim 1, wherein said fiber component comprises guayule bagasse.

4. The particleboard according to claim 1, wherein said adhesive composition further comprises unmodified guayule resin, wherein said unmodified guayule base resin is included in said adhesive composition in an amount ranging from 0.1% to 50% by weight of the total weight of said soy protein.

5. The particleboard according to claim 1, wherein said adhesive composition comprises 50% by weight of the total weight of said fiber component and said adhesive composition.

6. The particleboard according to claim 1, wherein said soy protein comprises from 5% to 40% by weight of the total weight of the adhesive composition.

7. The particleboard according to claim 1, wherein said base-solvent modified guayule resin comprises from 0.1% to 25% by weight of the total weight of the adhesive composition.

8. The particleboard according to claim 1, wherein said base-solvent modified guayule resin comprises from 0.1 to 50% of the total weight of said soy protein.

9. The particleboard of claim 1, wherein said base-solvent modified guayule resin comprises 0.75% by weight of the total weight of the adhesive composition.

10. The particleboard of claim 9, wherein said soy protein comprises 10% by weight of the total weight of the adhesive composition.

11. The particleboard of claim 1, wherein said base comprises NaOH.

12. The particleboard of claim 1, wherein the solvent mixture further comprises hexane and water.

13. A method for forming particleboard, comprising:

forming an adhesive composition comprising a base-solvent modified guayule resin and soy protein;

mixing the formed adhesive composition with a fiber component to form a mixture;

introducing the mixture to a press; and pressing the mixture in the press at forces ranging from 0.75 to 25 megaPascals (108 to 3625 pounds per square inch) and at temperatures ranging from 110 to 190 degrees Celsius wherein said step of forming an adhesive composition comprises: forming a base-solvent modified guayule resin; forming a soy protein slurry comprising a soy protein; and mixing said modified guayule resin with said soy protein slurry, wherein said step of forming a base-solvent modified guayule resin comprises: forming a resin mixture by mixing an unmodified base resin with a solvent mixture, the solvent mixture comprising acetone; mixing NaOH with the resin mixture; reacting the NaOH with the guayule base resin via a saponification process; and extracting a bottom phase of the base-solvent modified guayule resin in acetone.

14. The method according to claim 13, wherein said step of forming a soy protein slurry comprises:

forming a phase-modified soy protein by mixing a soy protein with water; and introducing an acid to the phase-modified protein to adjust the pH to 7.0.

* * * * *